United States Patent [19]
Holmes

[11] Patent Number: 5,875,395
[45] Date of Patent: Feb. 23, 1999

[54] SECURE EQUIPMENT AUTOMATION USING A PERSONAL BASE STATION

[75] Inventor: David William James Holmes, Redmond, Wash.

[73] Assignee: AT&T Wireless Services Inc., Kirkland, Wash.

[21] Appl. No.: 728,513

[22] Filed: Oct. 9, 1996

[51] Int. Cl.$^6$ .............................. H04B 1/00; H04M 11/00
[52] U.S. Cl. ................ 455/420; 455/151.1; 455/410; 455/419; 455/420; 340/825.31; 340/825.34; 340/825.36
[58] Field of Search .................. 455/88, 151.1, 455/151.2, 152.1, 410, 411, 418, 419, 420; 340/825.31, 825.34, 825.36

[56] References Cited

U.S. PATENT DOCUMENTS

| | | | |
|---|---|---|---|
| 4,882,746 | 11/1989 | Shimada | 455/462 |
| 4,928,778 | 5/1990 | Tin | 123/179.3 |
| 4,989,230 | 1/1991 | Gillig et al. | 455/552 |
| 5,086,385 | 2/1992 | Launey et al. | 364/188 |
| 5,109,222 | 4/1992 | Welty | 340/825.72 |
| 5,127,042 | 6/1992 | Gillig et al. | 445/552 |
| 5,218,552 | 6/1993 | Stirk et al. | 364/492 |
| 5,282,250 | 1/1994 | Dent et al. | 455/411 |
| 5,353,331 | 10/1994 | Emery et al. | 455/461 |
| 5,442,680 | 8/1995 | Schellinger et al. | 455/426 |
| 5,461,372 | 10/1995 | Busak et al. | 340/825.31 |
| 5,463,674 | 10/1995 | Gillig et al. | 455/552 |
| 5,608,778 | 3/1997 | Partridge, III | 455/411 |
| 5,682,142 | 10/1997 | Loosmore et al. | 455/88 |

Primary Examiner—Willis R. Wolfe
Assistant Examiner—Hieu T. Vo

[57] ABSTRACT

A system and method for preventing unauthorized use of a remotely operated system, by using a sophisticated bi-directional verification schemes. The bi-directional verification schemes are based on random challenge and response between a mobile station and a cellular network. The cellular network discriminates between "pirate" mobile stations and mobile stations authorized to use the cellular network. The security afforded by bi-directional verification is applied to a system and method for use in conjunction with remotely operated systems, including one or more pieces of application equipment or a home automation system.

19 Claims, 5 Drawing Sheets

SECURE EQUIPMENT AUTOMATION USING A PERSONAL BASE STATION

FIELD OF THE INVENTION

The invention relates to secure data transfer and data encryption and specifically application of a secure data transfer and data encryption method and system in an automation system such as a home automation system.

BACKGROUND OF THE INVENTION

Many systems in homes and in automobiles are operated remotely using low-power radio transmitters, some of which comply with FCC Part 15 rules. Examples of remotely operated systems include garage door openers and intruder alarm disable switches. Although these systems, like modern cordless telephones, employ some basic security encoding of their transmitted signals, they have some pitfalls. For example, the basic security coding on remotely operated systems may be easily duplicated.

Typically, remotely operated systems include a transmitter and a receiver, each having the same security code programmed onto it. The security code is identical on each transmission between the transmitter and receiver, is transmitted at a low rate, and has a very limited number of separate code combinations possible (typically up to $2^{15}$). This basic security code is easily duplicated by intercepting a transmission from the transmitter, or by "tumbling" the security code in a duplicate transmitter.

In addition to the problem of transmitter duplication, there is typically no verification of the transmitter by the receiver. Thus, if a duplicate or pirate transmitter is created in one of the aforementioned ways, there is no way for the receiver to distinguish the duplicate transmitter from a legitimate transmitter by interrogation, because the radio link operates in one direction only.

Some improved transmitters have been designed to attempt to overcome these defects by using a "rolling code" which changes each time the transmitter is successfully used. However, these improved transmitters are still vulnerable to duplication because there is no bi-directional verification of the transmitter. This situation is similar to that which currently exists in cellular systems, where duplication of a mobile station's identification number (MIN) and its electronic serial number (ESN) in a "pirate" mobile station allows calls to be made on the pirate mobile station which are then charged to the account of a legitimate user.

SUMMARY OF THE INVENTION

In order to overcome problems of unauthorized use of a remotely operated system, sophisticated bi-directional verification schemes have been introduced into cellular phone standards. These bi-directional verification schemes are based on random challenge and response between the mobile station and the cellular network. Each the mobile station and the cellular network contain shared secret information, which may include a MIN, an ESN, and an authentication key. During the challenge, data is transmitted to the mobile station and a signed response from the mobile station is expected. The signed response is based on the shared secret data known only to the mobile station and the cellular network. If the signed response from the mobile station matches the calculated value at the cellular network, the mobile station is allowed to use the network. If the signed response is not the same as that calculated at the cellular network, the mobile station is rejected. In this manner, the cellular network can discriminate between "pirate" mobile stations and the mobile stations authorized to use the cellular network.

It is an object of the present invention to apply bi-directional verification to a personal base station for use in conjunction with remotely operated systems. It is a further object of the invention to implement a personal base station for control of at least one piece of application equipment and for home automation.

The personal base station includes a radio transceiver which receives and transmits data, such as commands, between a mobile station and a personal base station. A security module is coupled to the radio transceiver and authenticates the identity of the mobile station using cellular bi-directional verification. An application interface is coupled to the radio transceiver, the security module, and application equipment. The application interface translates data between the radio transceiver and the application equipment when permitted based on output from the security module.

BRIEF DESCRIPTION OF THE DRAWINGS

These and other objects, features, and advantages will become more fully appreciated with reference to the accompanying drawings and detailed description.

DETAILED DESCRIPTION OF THE INVENTION

Figure 1:
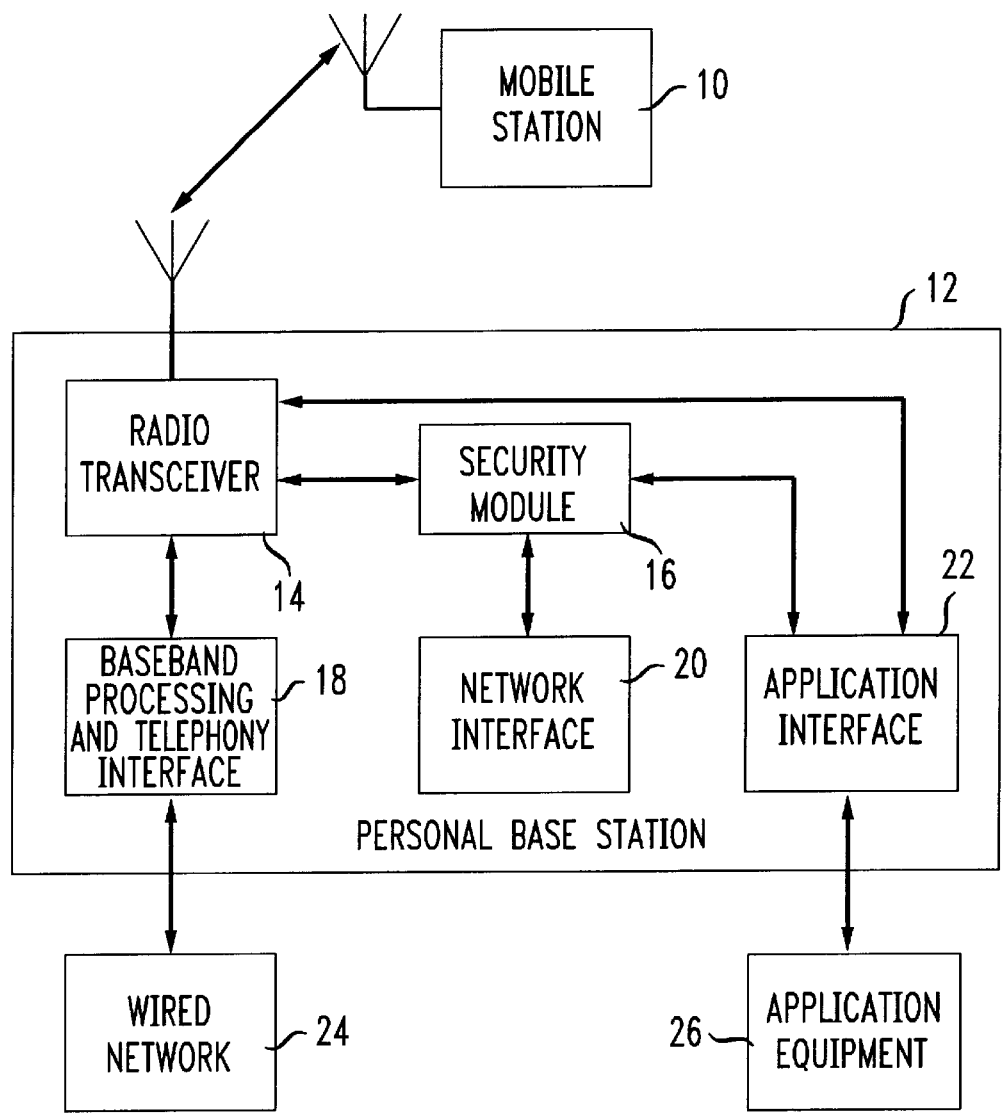
FIG. 1 depicts a personal base station with interfaces to a mobile station, a wired network, and one or more a home automation devices.

FIG. 1 depicts a personal base station 12. The personal base station 12 includes a radio transceiver 14, a security module 16, a baseband processing and telephony interface 18, a network interface 20, and an application interface 22. The radio transceiver 14 demodulates and decodes signals transmitted from a remote mobile station 10. Demodulation and decoding may be performed by many methods, including the commonly used and widely known GSM technique, and the techniques described in the Telecommunication Industries Association (TIA) and Electronic Industries Association (EIA) standards IS-136.1, IS-136.2, IS-95, and IS-91.

A baseband processor and telephony interface 18 is coupled between a wired network 24, a radio transceiver 14 and the network interface 20. The baseband processing and telephony interface 18 receives signals from and transmits signals to the wired network 24 in a well known manner. The network interface 20 is coupled to the security module 16 and the application interface 22. The network interface 20 converts signals received from the baseband processing and telephony interface 18 to data, and converts data to signals for transmission from the baseband processing and telephony interface 18.

The security module 16 is coupled to the radio transceiver 14, the application interface 22 and the network interface 20. The security module 16 performs bi-directional verification of the mobile station 10 and initiates and responds to challenges from the mobile station 10. The technique of bi-directional verification may be based on a technique specified by the GSM standard, or on a technique as described in TIA and EIA standards IS-136.1, IS-136.2, IS-95, and IS-91, hereby incorporated by reference herein. The security module 16 also performs verification of a terminal at a wired network 24 and may be accomplished numerous techniques including the TIA and EIA Aker standard. Once the authenticity of the identity of a mobile station 10 or terminal at a wired network 24 has been established, the security module 16 produces an output indicating whether or not the mobile station 10 or terminal at wired network 24 is authentic.

The application interface 22 is coupled to the radio transceiver 14 and the security module 16, and is connectable to one or more pieces of application equipment 26. The application interface 22 translates data, which may include commands, between the mobile station 10 or wired network 24 and the application equipment 26, when permitted based on the output of the security module 16. The application equipment 26 may include a single device such as a garage door opener or a vast array of devices including a home security system, lights, various household appliances, and subsystems within the house such as the heating and cooling systems. The application interface 22 can operate simply as a translator of data, including commands, issued by a mobile station 10 or a wired network 24 to application equipment 26. Conversely, the application interface 22 can also be more complex, supporting continuous monitoring and controlling of application equipment 26 and supporting modification of the application interface 22 remotely via a mobile station 10 or a wired network 24 properly authenticated by the security module 16.

Home automation systems which continuously monitor and control application equipment and which are suited to implement an application interface are well-known. U.S. Pat. No. 5,086,385, hereby incorporated by reference herein, is directed to an expandable home automation system making use of the well known smart house and CEBUS data buses. U.S. Pat. No. 5,218,552, hereby incorporated by reference herein, is directed to a control apparatus for use in a dwelling.

The use of a home automation system to implement an application interface 22 of a personal base station 12 allows secure remote access to a home automation system using a mobile station 10 or a wired network 24. Bi-directional verification of the mobile station 10 or user at a wired network 24 by the security module 16 creates the secure remote access. When implemented for home automation, the personal base station 12 may notify a user either via a mobile station 10 or via a wired network 24 that there is a problem with the application equipment 26. For example, if a security system, monitored and controlled by the application interface 22 is set off, the application interface 22 of the base station 12 may initiate a page of the user via a mobile station 10 or the wired network 24. Such page will incorporate bi-directional verification of the mobile station 10 or the wired network 24 using security module 16 to ensure the identity of the receiving unit. If the user is at the mobile station 10 or at the wired network 24, the user may receive notification of the disturbance and take action by either issuing a command to the personal base station 12 or perhaps calling the police or returning home. Furthermore, if either the mobile station 10 or the wired network 24 is in use, the personal base station 12 may page the one not in use to report information.

Figure 2:
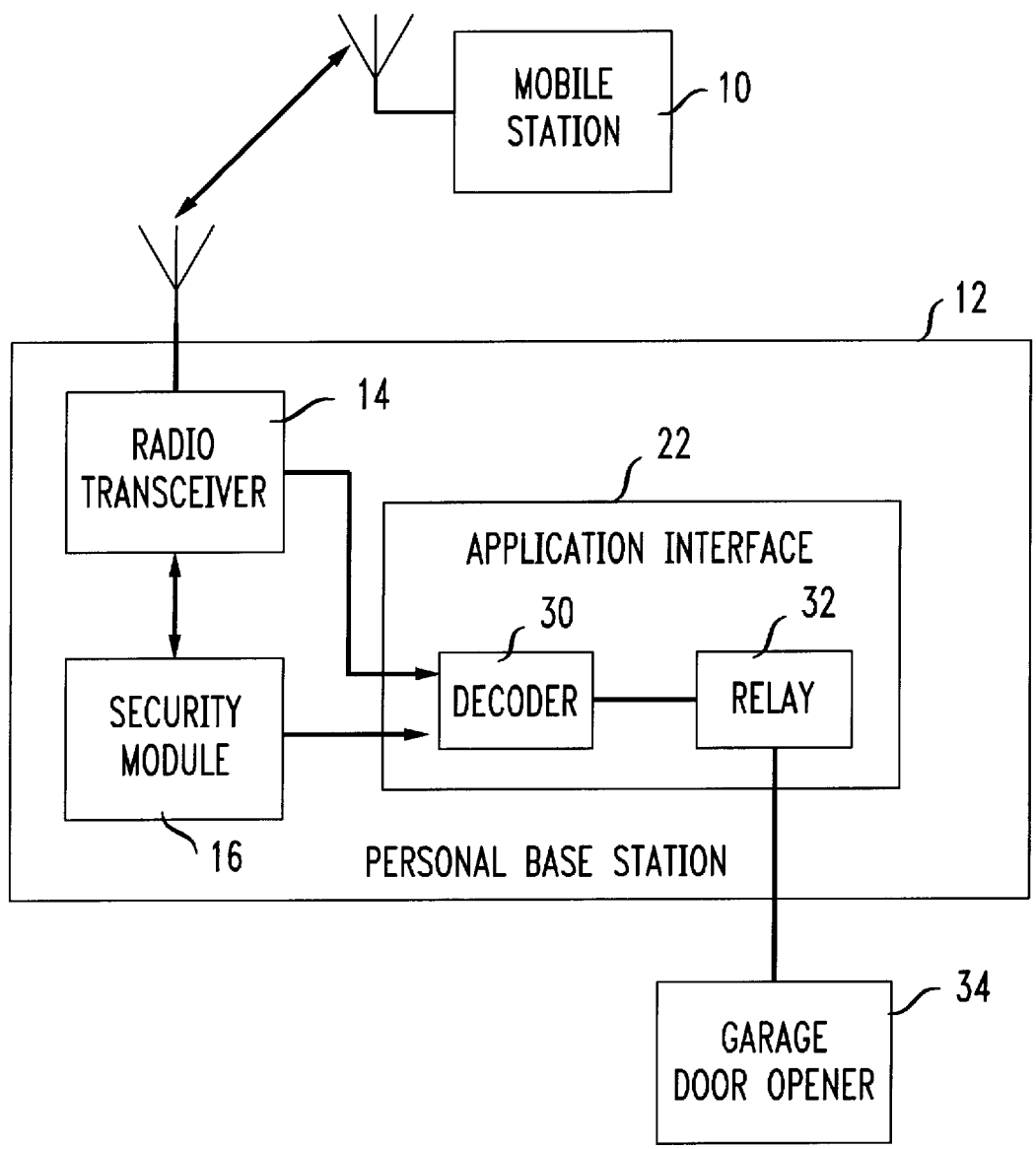
FIG. 2 depicts an embodiment of the application interface within a personal base station.

FIG. 2 depicts a simplified view of an embodiment of the application interface 22 within a personal base station 12. The personal base station 12 has a radio transceiver 14, a security module 16, and an application interface 22. The application interface 22 has a decoder 30 coupled to a relay 32. The radio transceiver 14 is coupled to the security module 16 and the decoder 30. The security module 16 is coupled to the decoder and to the radio transceiver 14. A garage door opener 34 is shown coupled to the relay 34 for purposes of example. However, the application equipment 26 coupled to the application interface 22 could be any conceivable device, including devices outside of the home, for example a car-door opening device, a device for starting a car, and a home security system, to name a few devices.

A user at a mobile station 10 may gain command control over the garage door opener 34 by activating a mobile station 10. The radio transceiver 14 at the personal base station 12 will receive transmissions from the mobile station 10 and the security module 16 will then conduct bi-directional verification of the transmitter to verify the identity of the mobile station 10. This process may include the personal base station 12 issuing and/or responding to challenges from the mobile station 10. If the mobile station 10 is not verified to be authentic, the security module outputs a signal to the decoder 34 which indicates that data, including commands, from the mobile station 10 are to be ignored. If the mobile station 10 is recognized, the security module 16 outputs a signal to the decoder 30 indicating that the mobile station 10 is valid.

Once validated, a user at the mobile station 10 may issue data, including commands, from the mobile station 10. Data issued is received by the radio transmitter 14 and passed to the decoder 30. The decoder 30 decodes the data from the radio transmitter 14 and the security module 16 and, based on this data, activates the garage door opener 34 via the relay 32.

Figure 3:
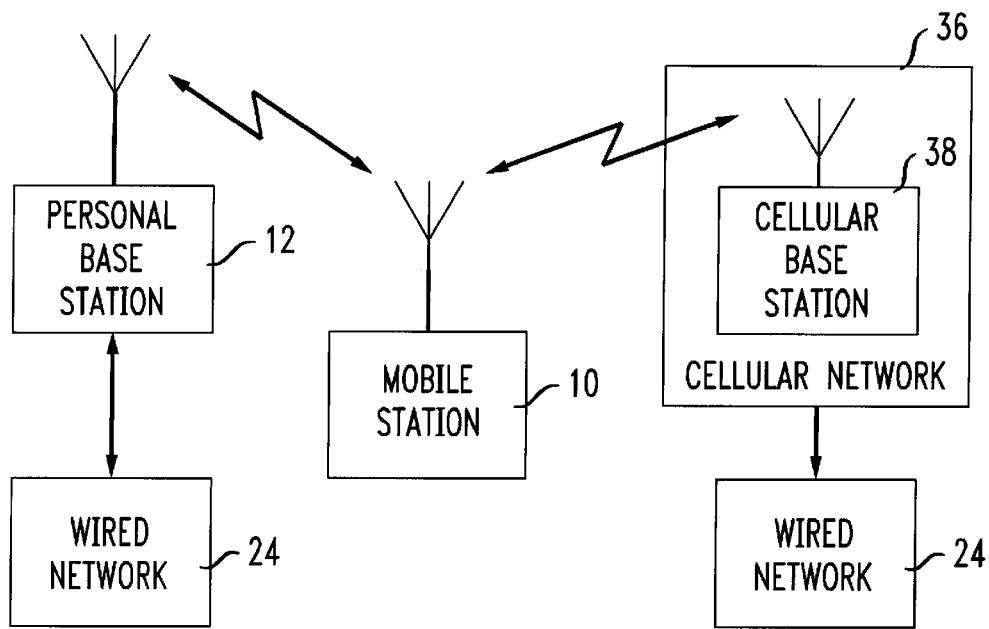
FIG. 3 depicts a mobile station capable of communication between a personal base station when within range of the personal base station and a cellular base station.

In FIG. 3, a personal base station 12, as shown in FIG. 1, is depicted in close proximity to a cellular network 36. The personal base station 12 is coupled to a wired network 24 which, for purposes of this example, will be assumed to be a PSTN. The cellular network 36 is also coupled to a wired network 24 which may implement a PSTN. When a mobile station 10 is in close proximity to the personal base station 12, the mobile station 10, using bi-directional verification, will transmit to and receive signals from the personal base station 12. The radio transceiver 14 of the personal base station 12 receives and transmits signals to the mobile station 10. The security module 16 of the personal base station 12 verifies the identity of the mobile station 10. Subsequently, the radio transceiver 14 passes transmissions between the mobile station 10 and the wired network 24 via the baseband processing and telephony interface 18. In this way, a mobile station 10 may access a land-line telephone network through a personal base station 12.

Once a mobile station 10 moves out of range of the personal base station 12, the mobile station 10 may begin to communicate with a cellular base station 38 of a cellular network 36. The personal base station 12 may "hand-off" the mobile station 10 to a cellular network 36 when the mobile station 10 moves out of range of the personal base station 12. The cellular network 36 then routes a call from the mobile station 10 to a wired network 24, for example a PSTN. Alternatively, a user at a mobile station 10 may manually select or cause the mobile station 10 to redirect transmissions to a cellular network 36. Similarly, when a mobile station 10 which has been communicating to a cellular network 36 comes into close proximity to a personal base station 12, the cellular network 36 may hand off the mobile station 10 to the personal base station 12 either by autonomous action of the personal base station 12 or by manual action of the user at the mobile station. Thus, a user can reduce cellular telephone charges by routing calls through a personal base station 12 when his mobile station 10 is in close proximity to the personal base station 12.

Figure 4:
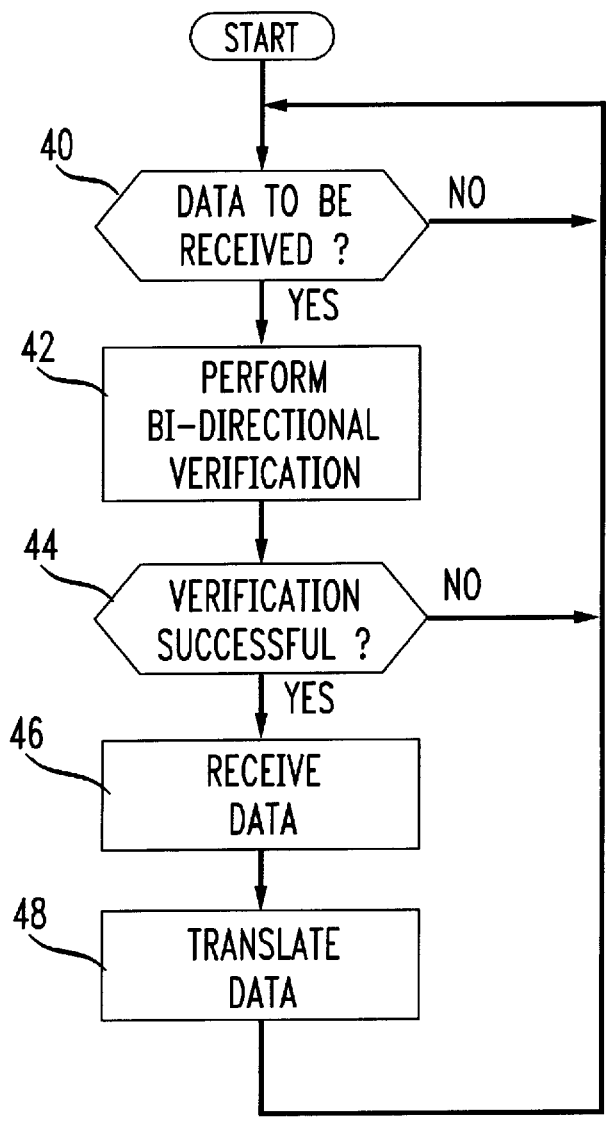
FIG. 4 depicts a method for transmitting data, including commands, from a either a mobile station or a wired network to application equipment.

FIG. 4 depicts a method for transmitting data, including commands, from a either a mobile station 10 or a wired network 24 to application equipment. In step 40, personal base station 12 waits for data to be received. If no data is received, step 40 is repeated. If data is received, bi-directional verification is performed by the security module 16 in step 42 to authenticate the mobile station 10 or the wired network 24. If the verification is successful in decision step 44, the personal base station 12 receives data, including commands, from the mobile station 10 or the wired network 24 in step 46. Otherwise, if verification of the mobile station 10 or the wired network 24 by the security module 16 is not successful in step 44, step 40 is invoked. After data is received in step 46 by the personal base station 12, the personal base station 12 translates the data in step 48, which data may include commands, to the application equipment 26 specified by the data. Subsequently, method step 40 is resumed.

Figure 5:
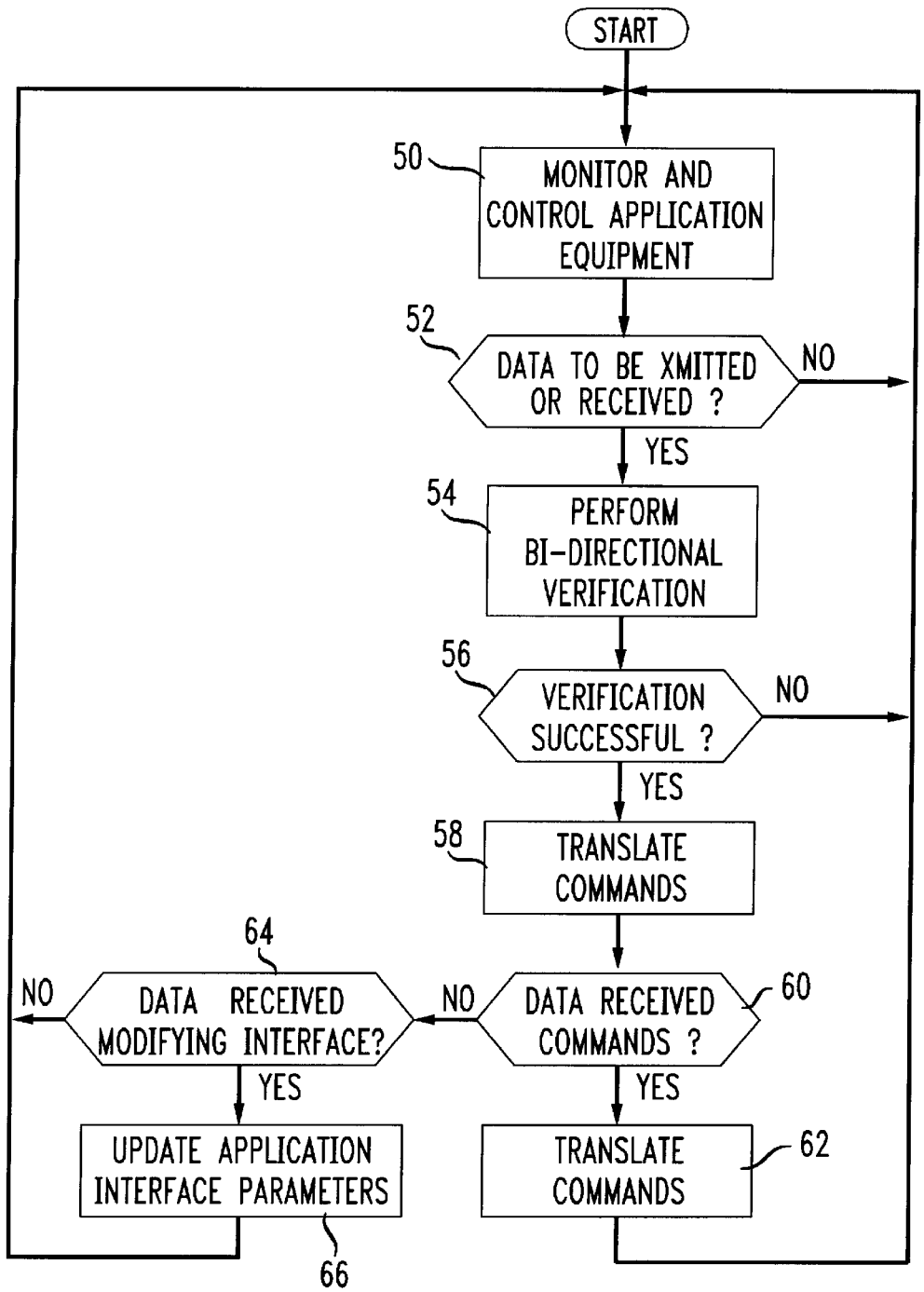
FIG. 5 depicts a method of transmitting data between a mobile station or a wired network and a personal base station, in which the application interface of the personal base station monitors and controls application equipment.

FIG. 5 depicts a method of transmitting data between a mobile station 10 and a personal base station 12, in which the application interface 22 of the personal base station 12 monitors and controls application equipment 26. In step 50, the application interface 22 monitors and controls application equipment 26 coupled to the personal base station 12. An application interface performing monitoring and controlling may be implemented by a home automation system. In step 52, the personal base station monitors whether data is to be sent or received. If no data is to be sent or received, step 50 is resumed. If data is to be sent or received, bi-directional verification to authenticate a mobile station 10 or a wired network 24 to the personal base station 12 is undertaken in step 54.

If the authentication is not successful in step 56, step 50 is resumed. If authentication is successful in step 56, the personal base station 12 receives data from or transmits data to a mobile station 10 or a wired network 24 in step 58. Then in step 60, if data has been received with commands for application equipment 26, the commands are translated in step 62 and sent to the application equipment 26 for execution. If commands are not received for application equipment 26, in step 64 the personal base station determines whether data received from either the mobile station 10 or the wired network 24 is directed for monitoring or controlling of application equipment 26 performed in step 50. If not, step 50 is resumed. If the data is for monitoring or controlling application equipment 26, step 66 is executed and the parameters used to monitor and control the application equipment in step 50 may be updated by the data received from the mobile station 10 or the wired network 24. Subsequently, step 50 is resumed.

Although specific embodiments of the invention have been disclosed, it will be understood by those having skill in the art that changes can be made to those specific embodiments without departing from the spirit and the scope of the invention.

What is claimed is:

1. A personal base station, comprising:

a radio transceiver receiving data from and transmitting data to a mobile station, said data including commands;

a security module, coupled to said radio transceiver, authenticating an identity of said mobile station using bi-directional verification, and said security module producing an output based on an authenticated identity of said mobile station; and an application interface, coupled to said radio transceiver and said security module, and being connectable to application equipment, said application interface translating data received by said radio transceiver when permitted based on said output from said security module.

2. The apparatus according to claim 1, wherein said application interface is coupled to said application equipment; and wherein said application interface translates data received from said radio transceiver to said application equipment, permitting control of said application equipment by said mobile station.

3. The apparatus according to claim 1, wherein said application interface is coupled to said application equipment; and wherein said application interface translates data between said radio transceiver and said application equipment when permitted based on said output from said security module, thus permitting monitoring and control of said application equipment by said mobile station.

4. The personal base station according to claim 3, wherein a piece of said application equipment produces an alarm signal in response to a predetermined condition, and said application interface receives said alarm signal and transmits data to said mobile station via said radio transmitter indicating the presence of said alarm signal at said application equipment.

5. The apparatus according to claim 1, wherein said application interface monitors and controls said application equipment, and said application interface is modifiable based on data received from said mobile station.

6. The personal base station according to claim 4, further comprising:

a network including at least one terminal;

a baseband processing and telephony interface, coupled to said radio transceiver and said network, transmitting signals to and receiving signals from said terminal; and a network interface coupled to said security module, said baseband processing and telephony interface, and said application interface, said network interface converting said signals from said network to and from data; and wherein said security module receives said data from said network interface, authenticates an identity of said terminal on said network using a bi-directional verification scheme, and generates an output based on an authenticated identity of said terminal; and wherein said application interface translates between said application equipment and said digital information from said network interface when permitted based on said output from said security module, and said application interface being modifiable based on said data from said network.

7. The personal base station according to claim 6, wherein the personal base station is implemented as part of a home automation system.

8. The personal base station according to claim 7, wherein said application interface includes:
   at least one user interface unit displaying information to a user and allowing said user to input and display data on said application interface;
   a memory for storing data;
   a database for storing data;
   a data bus carrying data to and from said at least one user interface unit, said radio transceiver, said network interface, said security module, said memory, and said database; and
   a processor, transmitting data to and receiving data from said data bus, said processor monitoring and controlling said application equipment, and said processor translating data, when permitted based on said output from said security module, between said radio transceiver, said at least one user interface unit, and said network interface and said application equipment, and said processor being configurable by a user.

9. The personal base station according to claim 6, wherein said network verification scheme is based on an Aker authentication technique.

10. The personal base station according to claim 5, wherein the personal base station is implemented as part of a home automation system.

11. The apparatus according to claim 1, wherein said bi-directional verification technique is based on a GSM authentication technique.

12. The apparatus according to claim 1, wherein said bi-directional verification technique is based on a TIA/EIA standard IS-136.1 authentication technique.

13. The apparatus according to claim 1, wherein said bi-directional verification technique is based on a TIA/EIA standard IS-136.2 authentication technique.

14. The apparatus according to claim 1, wherein said bi-directional verification technique is based on a TIA/EIA standard IS-95 authentication technique.

15. The apparatus according to claim 1, wherein said bi-directional verification technique is based on a TIA/EIA standard IS-91 authentication technique.

16. A method for making secure transmissions between a mobile station and application equipment, the method comprising the steps of:
   receiving and transmitting data between a mobile station and a personal base station, said data including commands;
   authenticating an identity of said mobile station using bi-directional verification; and
   translating between said personal base station and said application equipment when the identity of said mobile station is authenticated.

17. The method according to claim 16, further comprising the step of monitoring and controlling said application equipment by said personal base station.

18. The method according to claim 17, wherein said monitoring and controlling is modifiable based on data from said mobile station.

19. The method according to claim 18, wherein the method is performed by at least a portion of a home automation system.

* * * * *